(12) United States Patent
Song et al.

(10) Patent No.: US 9,049,438 B2
(45) Date of Patent: *Jun. 2, 2015

(54) STEREOPSIS DISPLAY DEVICE AND DRIVING METHOD THEREOF

(75) Inventors: June-Young Song, Yongin (KR); Byung-Sik Koh, Yongin (KR); Hye-Jin Shin, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 813 days.

This patent is subject to a terminal disclaimer.

(21) Appl. No.: 13/300,504

(22) Filed: Nov. 18, 2011

(65) Prior Publication Data

US 2012/0147000 A1 Jun. 14, 2012

(30) Foreign Application Priority Data

Dec. 13, 2010 (KR) .......................... 10-2010-0126987

(51) Int. Cl.
*G09G 3/30* (2006.01)
*H04N 13/04* (2006.01)

(52) U.S. Cl.
CPC ....... *H04N 13/0438* (2013.01); *H04N 13/0497* (2013.01)

(58) Field of Classification Search
CPC .......................... G09G 3/30; G09G 2320/0209
USPC ............................... 345/55, 76, 211, 419, 427
See application file for complete search history.

(56) References Cited

U.S. PATENT DOCUMENTS

| 2007/0079191 A1* | 4/2007 | Shin .............................. 714/726 |
| 2007/0126691 A1* | 6/2007 | Lin et al. ....................... 345/102 |
| 2007/0242068 A1* | 10/2007 | Han et al. ...................... 345/427 |
| 2009/0225068 A1* | 9/2009 | Jeong et al. ................... 345/211 |
| 2010/0309381 A1* | 12/2010 | Nakagawa et al. ........... 348/705 |

FOREIGN PATENT DOCUMENTS

| KR | 10-2006-0093610 A | 8/2006 |
| KR | 10-2008-0029929 A | 4/2008 |
| KR | 10-2009-0091996 A | 8/2009 |

* cited by examiner

*Primary Examiner* — Premal Patel
(74) *Attorney, Agent, or Firm* — Knobbe Martens Olson & Bear LLP (57) ABSTRACT

A stereoscopic image display device and a driving method thereof are disclosed. According to one aspect, the device includes a scan driver and a data driver configured to transmit scan signals and data signals to scan lines and data lines respectively, a light emission driver configured to transmit light emission control signals to light emission control lines, and a display unit divided into pixel areas including pixel lines. A controller is configured to control the drivers, generate a left-eye and right-eye image data signals, and supply the generated signals to the data driver. The light emission driver includes light emitting circuits configured to sequentially transmit light emission control signals that are equivalent to each other to light emission control lines of the corresponding pixel area.

28 Claims, 6 Drawing Sheets

Prior Art

FIG. 1

Prior Art

STEREOPSIS DISPLAY DEVICE AND DRIVING METHOD THEREOF

CROSS-REFERENCE TO RELATED APPLICATIONS

This application claims priority to and the benefit of Korean Patent Application No. 10-2010-0126987 filed in the Korean Intellectual Property Office on Dec. 13, 2010, the entire contents of which are incorporated herein by reference.

BACKGROUND

1. Field

The disclosed technology relates to a stereoscopic image display device and a driving method thereof. More particularly, the technical field relates to a stereoscopic image display device that can prevent crosstalk and realize a three-dimensional stereoscopic image with high image quality by providing sufficient scanning time, and a driving method thereof.

2. Description of the Related Technology

Recently, various flat panel displays capable of reducing weight and size of display components, as well as reduce other drawbacks of cathode ray tubes have been developed. Technologies used in flat panel displays include a liquid crystal display (LCD), a field emission display (FED), a plasma display panel (PDP), and an OLED display.

Among flat panel display technologies, the OLED type of display, which displays an image by using an organic light emitting diode generating light by recombination of electrons and holes, consumes less power while having a rapid response speed. Additionally, an OLED display provides excellent emission efficiency, luminance, and viewing angle.

In general, a plurality of pixels which emit light in the OLED display. The OLEDs generate light having a predetermined luminance to correspond to data current supplied form a pixel circuit.

Digital driving, which is one example of a gray expression method, adjusts a time when the OLED of the pixel is in a light emission state. In the case of the OLED display that follows the digital driving method, one frame is divided into a plurality of sub-frames and a light emitting period of each sub-frame is appropriately set in order to display a gray image. The pixel emits light during a sub-frame selected depending on an image signal for gray expression among the plurality of sub-frames constituting one frame.

Meanwhile, in order to display a stereoscopic image, at least two images corresponding to two different view points may be displayed within one frame display period. In general, a stereoscopic image display device displays a left-eye image and a right-eye image corresponding to a human visual system such that an image is received by a left and right eyes within one frame period.

That is, one frame period is divided into a left-eye image section and a right-eye image section and includes a left-eye image display period displaying the left-eye image in the left-eye image section and, thereafter, includes a right-eye image display period displaying the right-eye image in the right-eye image section.

According to a field sequential driving method, a display panel is sequentially scanned from an upper portion to a lower portion of the display panel. As a result, crosstalk of a left eye image and a right-eye image may occur.

Recently, research on reduction of crosstalk, and crosstalk prevention methods has been conducted. However, it is difficult to completely prevent crosstalk. In addition, expression of grayscales according to an original image data signal is not easily achieved due to luminance loss during the crosstalk prevention process. Furthermore, a data charging period according to a sufficient data signal cannot be assured.

Thus, it is desirable to provide a a display device that can display a clear three-dimensional stereoscopic image with high quality by completely preventing crosstalk, and simultaneously providing sufficient time writing data to the display and compensating luminance of the display.

The above information disclosed in this background section is only for enhancement of understanding of the background of the invention and therefore it may contain information that does not form the prior art that is already known in this country to a person of ordinary skill in the art.

SUMMARY OF CERTAIN INVENTIVE ASPECTS

Disclosed embodiments describe a stereoscopic image display device having advantages of realizing a clear three-dimensional stereoscopic image with high quality by eliminating crosstalk and reducing luminance loss.

According to one aspect, a driving method of a stereoscopic image display device is disclosed. The display device includes a plurality of pixel areas formed of a plurality of pixel lines, one frame including a sub-frame of a left eye image data signal writing period, a left eye display period according to the left-eye image data signal, a right-eye image data signal writing period, and a right eye image display period according to the right-eye image data signal. The method including sequentially activating pixels of each pixel line with a scan signal transmitted corresponding to each of the plurality of pixel lines, charging a data voltage corresponding to the left-eye image data signal or the right-eye image data signal to be displayed by the pixel, and simultaneously displaying a left-eye image or a right-eye image according to the data voltage with a plurality of equivalent light emission control signals that control light emission of the corresponding pixel area to the respective pixel areas.

According to another aspect, a stereoscopic image display device is disclosed. The display device includes a scan driver configured to transmit a plurality of scan signals to a plurality of scan lines, a data driver configured to transmit a plurality of data signals to a plurality of data lines, a light emission driver configured to transmit a plurality of light emission control signals to a plurality of light emission control lines, a display unit divided into a plurality of pixel areas including a plurality of pixel lines, each of the plurality of pixel areas configured to form a plurality of pixels respectively connected to the corresponding scan line, data line, and light emission control line, and a controller configured to control the scan driver, the data driver, and the light emission driver, generate a left-eye image data signal and a right-eye image data signal, and supply the generated signals to the data driver. The light emission driver includes a plurality of light emitting circuits respectively corresponding to the plurality of pixel areas. Each of the plurality of light emitting circuits sequentially transmits a plurality of light emission control signals that are equivalent to each other to a plurality of light emission control lines of the corresponding pixel area.

DETAILED DESCRIPTION OF CERTAIN INVENTIVE EMBODIMENTS

The disclosed embodiments will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the exemplary embodiments, like reference numerals designate like elements throughout the specification. Therefore, only elements other than those described with respect to the first exemplary embodiment will be described. Additionally, the drawings and description are to be regarded as illustrative in nature and not restrictive.

Throughout the specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising," will be understood to imply the inclusion of stated elements but not the exclusion of any other elements.

Figure 1:
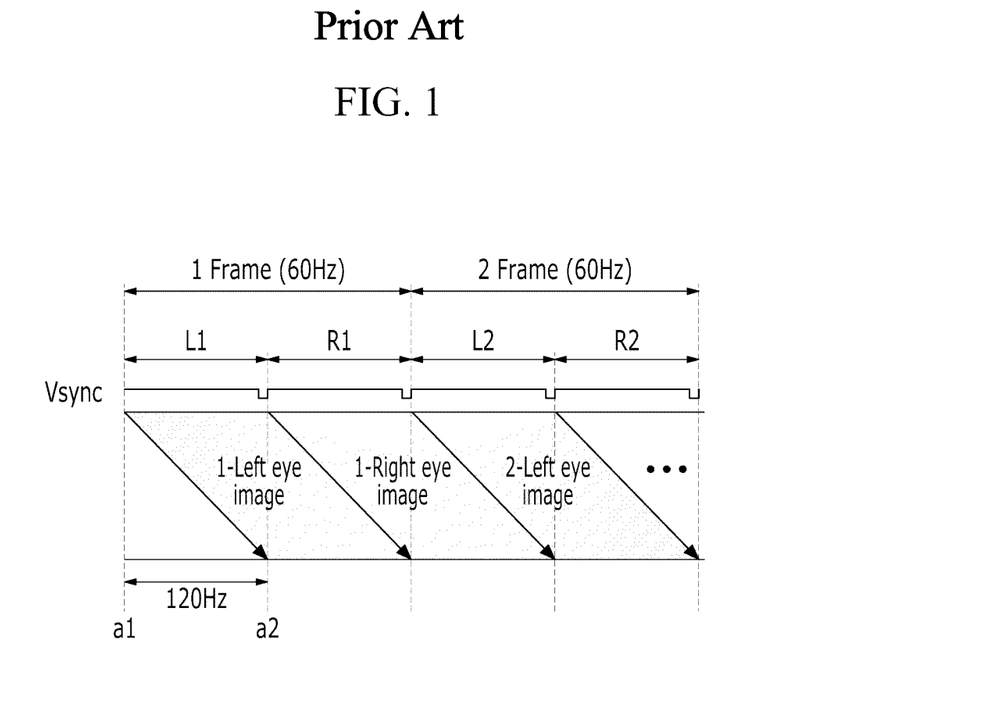
FIG. 1 and FIG. 2 are frame schematic diagrams of a conventional driving method of a stereoscopic image display device.
Figure 2:
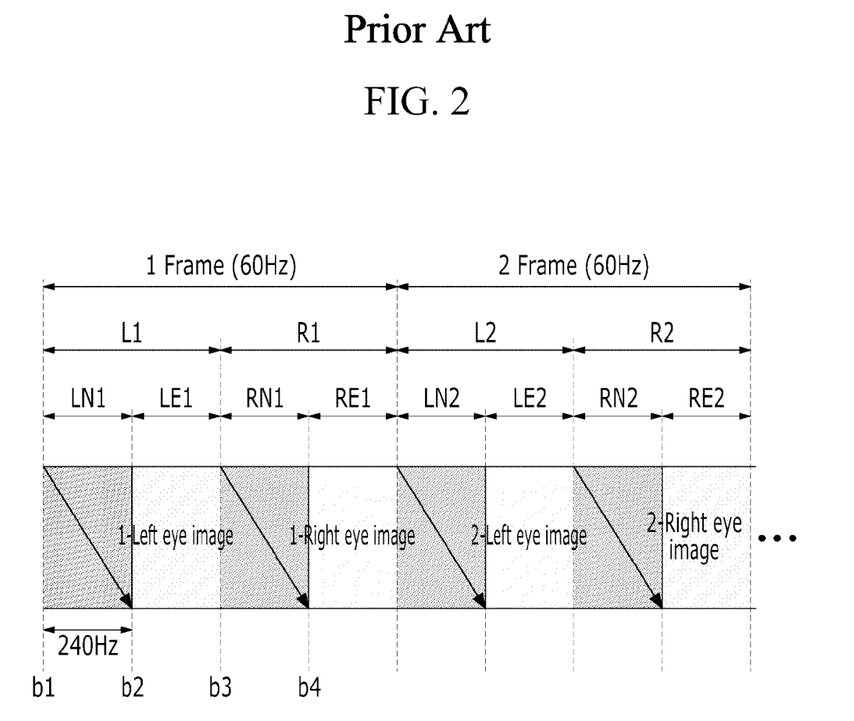

FIG. 1 and FIG. 2 are frame schematic diagrams of a conventional driving method of a stereoscopic image display device.

FIG. 1 and FIG. 2 illustrate an example of a lens-based three-dimensional stereoscopic image displayed in a frame unit in a stereoscopic image display device according to a field progressive driving method.

In order to display the lens-based three-dimensional stereoscopic image, a left-eye image and a right-eye image are alternately viewed within one frame at a predetermined driving frequency (e.g., driving frequency of 60 Hz).

According to the conventional art illustrated in FIG. 1, light emission for scanning of the entire display panel and image displaying at a view point is performed during a sub-frame formed of left-eye image periods L1 and L2 and right-eye image periods R1 and R2. That is, scanning of the display panel is started by being synchronized at the time that a vertical synchronization signal Vsync is transmitted. Since one frame is 60 Hz, a scanning period for displaying an image at each view point may be correspond to a period from a view point a1 to a view point a2, that is, 120 Hz. While the entire display panel is sequentially scanned, the display panel sequentially emits light according to an image data signal for the corresponding view point such that an image for the corresponding view point is displayed. In this case, a light emission period of each view point image is also 120 Hz. According to these examples, a left-eye image and a right-eye image are simultaneously viewed in one display panel such that image crosstalk occurs.

A period during which the left-eye image and the right-eye image are simultaneously viewed should be eliminated in order to prevent occurrence of the crosstalk in the stereoscopic image driving method of FIG. 1. FIG. 2 illustrates a driving method for preventing the crosstalk which occurs in the conventional example. That is, a non-light emission period is inserted between the left-eye image and the right-eye image to separate left and right images in FIG. 2, and a data signal of the corresponding view point is written in the display panel during the non-light emission period. Thus, one frame is formed of a sub-frame of a left-eye image period and a sub-frame of a right-eye image period, and each image period is formed of a period during which the corresponding view point image data signal is written in and a period during which the corresponding view point image emits light. That is, in FIG. 2, 1 frame is formed of a sub-frame of a left-eye image period L1 and a sub-frame of a right-eye image period R1, and the left-eye image period L1 is formed of a left-eye image data signal writing period (i.e., a non-light emission period for a left-eye image) LN1 and a left-eye image light emission period LE1. Subsequently, the right-eye image period R1 formed of a right-eye image data signal writing period (i.e., a non-light emission period for a right-eye image) RN1 and a right-eye image light emission period RE1.

In FIG. 2, since one frame corresponds to a driving frequency of approximately 60 Hz, the left-eye image data signal writing period LN1, the left-eye image light emission period LE1, the right-eye image data signal writing period RN1, and the right-eye image light emission period RE1 are collectively driven with a driving frequency of approximately 240 Hz.

In order to prevent crosstalk, the non-light emission period may be disposed between the left and right-eye images as shown in FIG. 2. Prevention of crosstalk of left and right images by inserting a black image between the left-eye image and the right-eye image emit light has been suggested.

However, the above-stated technologies have problems in that a period for writing data of one frame in a display is relatively decreased and the driving frequency is increased such that charging of a voltage according to an accurate data signal in a storage capacitor of each pixel of the display panel within a predetermined time period is difficult. For example, with reference to FIG. 2, the driving frequency is increased to 240 Hz so that it is difficult to accurately express grayscales according to data signals by sufficiently writing a voltage according to an image data signal in a large-sized display panel. Further, the insertion of black image requires increased luminance for accurate expression of grayscales due to a decrease in luminance resulting from the insertion of black data. Accordingly, power consumption is increased.

Thus, a low-power driving stereoscopic image display device that can sufficiently assure a data writing period and prevent luminance loss in expression of grayscales while completely eliminating the crosstalk is suggested according to some embodiments.

Figure 3:
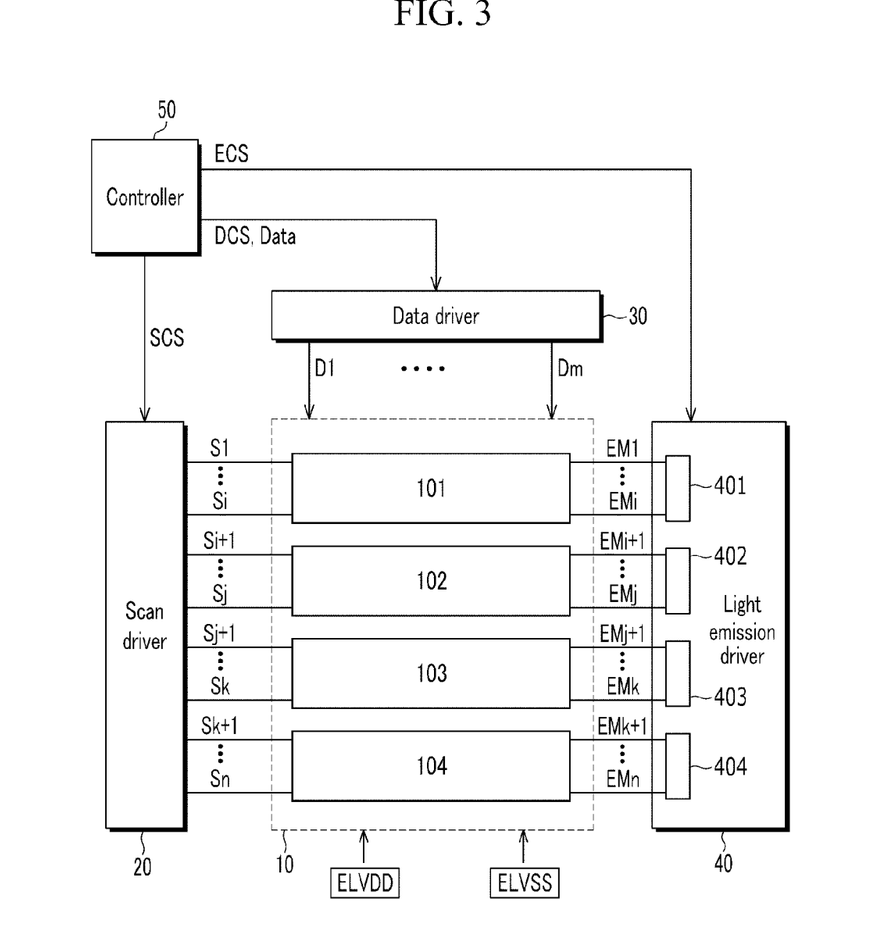
FIG. 3 is a block diagram of a stereoscopic image display device according to some embodiments.
Figure 4:
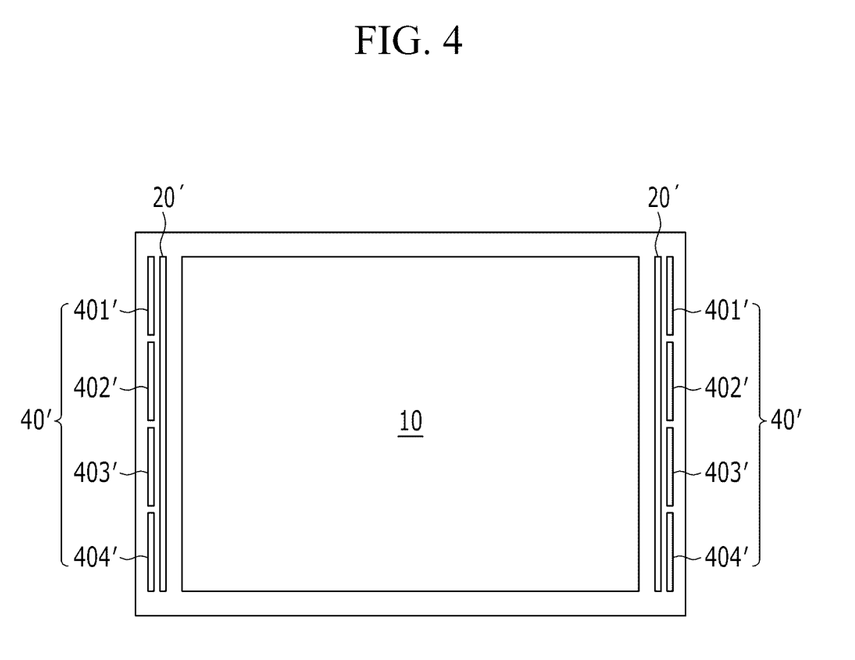
FIG. 4 is a layout view of the stereoscopic image display device of FIG. 3 according to some embodiments.

FIG. 3 is a block diagram of a stereoscopic image display device according to some embodiments, and FIG. 4 schematically illustrates a layout view of each configuration of the stereoscopic image display device.

With reference to FIG. 3, a stereoscopic image display device according to an some embodiments includes a display unit 10 having a plurality of pixels (not shown) respectively connected with scan lines S1 to Sn, data lines D1 to Dm, light emission control lines EM1 to EMn, a scan driver 20 configured to generate a scan signal and supply the scan signal to the scan lines S1 to Sn. The stereoscopic image display device further includes a data driver 30 configured to supply an image data signal according to an externally input image signal to the data lines D1 to Dm, a light emission driver 40 configured to generate a light emission control signal and supply the light emission control signal to the light emission control lines EM1 to EMn. A controller 50 is also provided for controlling the scan driver 20, the data driver 30, and the light emission driver 40.

Each pixel of the display unit is connected with a power supply line and thus external power voltages ELVDD and ELVSS are supplied thereto through the power supply line.

In the stereoscopic image display device according to the some embodiments, the display unit sequentially displays a left-eye image and a right-eye image corresponding to both eyes in order to display a stereoscopic image. When the left-eye image and the right-eye image are alternately displayed for each frame, additional shutter lenses are needed to recognize the alternately displayed left and right-eye images as a three-dimensional stereoscopic image.

That is, in order to recognize the three-dimensional stereoscopic image, a user should wear lenses which allow an image to be transmitted in only the left eye during a period of displaying the left-eye image and transmitted in only the right eye during a period of displaying the right-eye image.

Left eye lens and right eye lens of the shutter lenses are opened and closed during a period that a left-eye image and a right-eye image of the stereoscopic image display device are switched, and therefore the responding speed of the shutter lenses corresponds to the displaying speed of the left-eye image and the right-eye image.

The display unit is formed of a plurality of pixels arranged in a matrix format. When one pixel is formed by arranging the plurality of pixels in one line, the display unit 10 includes a plurality of pixel lines. The number of pixel lines is not limited to any number, but a display panel available in the market is formed of 1080 pixel lines.

According to some embodiments, the display unit 10 of the stereoscopic image display device may include at least two pixel areas each formed by grouping a predetermined number of pixel lines. The number of pixel areas partitioned in the display unit 10 may be determined according to a transition period that corresponds to a response speed of the shutter lenses formed for recognition of a stereoscopic image from the stereoscopic image display device. That is, as the transition period for opening and closing of the left eye lens and the right eye lens of the shutter lenses is decreased in response to the speed for changing left and right images of the stereoscopic image display device, the number of pixel areas of the display unit 10 is increased.

Preferably, the display unit 10 may include four pixel areas as shown in FIG. 3. That is, the display unit 10 shown in FIG. 3 is formed of a first pixel area 101, a second pixel area 102, a third pixel area 103, and a fourth pixel area 104. The number of pixel lines forming each pixel area is equal to each other.

Each pixel line of the first pixel area 101 is connected with the scan lines S1 to Si and the light emission control lines EM1 to EMi.

Each pixel line of the second pixel area 102 is connected with the scan lines Si+1 to Sj and the light emission control lines EMi+1 to EMj.

Each pixel line of the third pixel area 103 is connected with the scan lines Sj+1 to Sk and the light emission control lines EMj+1 to EMk.

Each pixel line of the fourth pixel area 104 is connected with the scan lines Sk+1 to Sn and the light emission control lines EMk+1 to EMn.

Corresponding to the scan signal sequentially transmitted through the scan lines connected to each pixel area, pixels included in each pixel area are activated and then each pixel area emits light. That is, pixels in each pixel area simultaneously emit light corresponding to a light emission control signal transmitted through the light emission control lines connected to the corresponding pixel area, and simultaneous light emission formed for each pixel area unit may be sequentially performed.

The controller 50 generates a data driving control signal DCS, a scan driving control signal SCS, and a light emission driving control signal ECS corresponding to synchronization signals supplied from an external source. The data driving control signal DCS is supplied to the data driver 30, the scan driving control signal SCS is supplied to the scan driver 20, and the light emission driving control signal ECS is supplied to the light emission driver 40.

In addition, the controller 50 converts an image signal supplied from an external source into an image data signal Data and supplies the image data signal Data to the data driver 30. The image data signal Data includes a left-eye image data signal and a right-eye image data signal.

The left-eye image data signal may correspond to an image data signal recognized from an image transmitted to the left eye of a user through a left eye portion (i.e., left eye lens) of the shutter lenses.

Further, the right-eye image data signal is recognized from an image transmitted to the right eye of the user through a right eye portion (i.e., right eye lens) of the shutter lenses.

The data driver 30 supplies a plurality of image data signals to the plurality of data lines D1 to Dm during a data writing period of each sub-frame corresponding to a left-eye image period and a right-eye image period in one frame. In further detail, the data driver 30 supplies a plurality of left-eye image data signals and a plurality of right-eye image data signals received according to the data driving control signal DCS transmitted from the controller 50 to the plurality of data lines.

When each pixel is activated by through synchronization at a time that a scan signal of gate-on voltage level is supplied during a data writing period in each sub-frame, the data driver 30 transmits a predetermined view point image data signal that corresponds to the activated pixel through the plurality of data lines. The gate-on voltage implies a switching transistor turn-on level for transmission of an image data signal to a gate electrode of a driving transistor that transmits a driving current to an organic light emitting diode included in the pixel. This will be described in further detail with a pixel structure with reference to FIG. 5.

A plurality of left-eye image data signals are transmitted through the plurality of data lines during a left-eye image data signal writing period of the left-eye image period, and a plurality of right-eye image data signals are transmitted during a right-eye image data signal writing period of the right-eye image period.

The scan driver 20 is synchronized at a start time of each sub-frame of one frame, that is, a start time of the left-eye image period or the right-eye image period and supplies a scan signal of a gate-on voltage level to the corresponding scan line among the plurality of scan lines S1 to Sn. A plurality of pixels included in a pixel line connected to the corresponding scan line among the plurality of scan lines S1 to Sn are activated by a scan signal having a gate-on voltage. A plurality of pixels of each pixel line selected by a scan signal receive a left-eye image data signal or a right-eye image data signal from the plurality of data lines DA1 to DAm.

The frequency of the scan signal is controlled by the scan control signal SCS. In this case, the frequency of the scan signal may be set with a predetermined value according to the number of pixel areas, a data writing period (i.e., non-light emission period) for each pixel area, and the like.

Further, the scan driver 20 supplies a plurality of scan signals for each sub-frame according to the scan control signal SCS. In this case, the scan control signal SCS may include a vertical synchronization signal Vsync (refer to FIG. 1) that determines each of the plurality of sub-frames and a horizontal synchronization signal that determines a transmission time point of each of the plurality of scan signals.

The light emission driver 40 includes a plurality of light emitting circuits. That is, the light emission driver 40 includes a number of light emission circuits that correspond to the number of pixel areas. According to some embodiments as illustrated in FIG. 3, the display unit 10 includes four pixel areas, and therefore the light emission driver 40 includes four light emitting circuits. That is, the light emission driver 40 includes a first light emitting circuit 401 connected to the light emission control lines EM1 to Emi connected to the first pixel area 101, a second light emitting circuit 402 connected to the light emission control lines EMi+1 to EMj connected to the second pixel area 102, a third light emitting circuit 403 connected to the light emission control lines EMj+1 to EMk connected to the third pixel area 103, and a fourth light emitting circuit 404 connected to the light emission control lines EMk+1 to EMn connected to the fourth pixel area 104. According to the some embodiments, the number of pixel areas of the display unit 10 may be determined according to the transition period that corresponds to the responding speed of the shutter lenses, and therefore the number of light emitting circuits of the light emission driver 40 may be set after the number of pixel areas is set.

Corresponding to the light emission driving control signal ECS transmitted from the controller 50, the light emission driver 40 controls the plurality of pixels of each pixel area included in the display unit 10 to emit light according to the image data signal. That is, the light emission driver 40 generates a light emission control signal and transmits the signal to the light emission control lines EM1 to EMn respectively connected to the plurality of pixels corresponding to the light emission control driving signal ECS. The light emission control driving signal ECS may control driving of each of the plurality of light emitting circuits in the light emission driver 40.

A plurality of light emission control signals generated through driving the respective light emitting circuits are transmitted to the plurality of pixels included in the corresponding pixel area with a gate-on voltage level, and the plurality of pixels emit light with a driving current according to the image data signal to display an image. When the light emission control signal is transmitted with a gate-off voltage level, the driving current supplied to the organic light emitting diode is blocked and thus the plurality of pixels do not emit light.

Each of the light emitting circuits of the light emission driver 40 transmits a light emission control signal of a gate-on voltage level to the corresponding light emission control line for pixels included in the corresponding pixel area of the display unit 10 to simultaneously emit light during a predetermined light emission period while being charged with a voltage according to the image data signal.

As a further detailed example, the first light emitting circuit 401 generates a plurality of light emission control signals and transmits the signals to the light emission control lines EM1 to EMi connected to the first pixel area 101, and the light emission control signals control the plurality of pixels included in the first pixel area 101 to simultaneously emit light during the same period as pulses in the same shape.

Similarly, the second light emitting circuit 402, the third light emitting circuit 403, and the fourth light emitting circuit 404 transmit light emission control signals that are pulses in the same shape to the corresponding pixel area.

A power supply (not shown) supplies two driving voltages required for driving the plurality of pixels. The two driving voltages are first power source voltage ELVDD and second power source voltage ELVSS. The first power source voltage ELVDD is a predetermined high-level voltage and the second power source voltage ELVSS is a predetermined low level voltage that is lower than the first power source voltage ELVDD.

In a layout view of a stereoscopic image display device according to an exemplary embodiment of FIG. 4, a display unit 10 is disposed at a center and a scan driver 20' and a light emission driver 40' are respectively disposed at both edges of the display unit 10. Particularly, in the exemplary embodiment of FIG. 4, the display unit 10 is increased in size and thus it is divided into two and the scan driver 20' and the light emission driver 40' are wire-lined to the respective display units 10. As a result, grayscales may be displayed with a data voltage according to an accurate data signal by preventing voltage drop due to wire line resistance.

Further, in FIG. 4, the light emission driver 40' includes four light emitting circuits 401', 402', 403', and 404' as in the block diagram of FIG. 3, and the respective light emitting circuits are arranged in a row.

Figure 5:
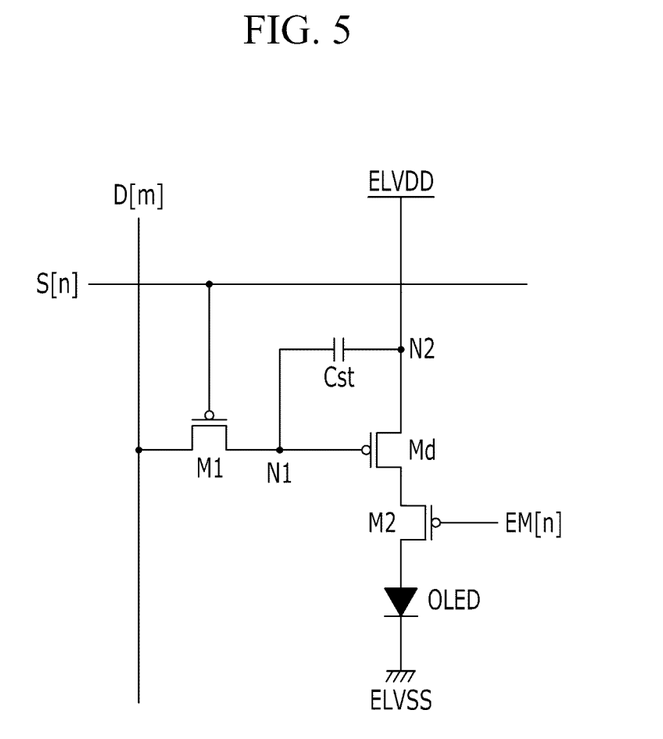
FIG. 5 is a circuit diagram of a configuration of a pixel circuit of the stereoscopic image display device of FIG. 3.

FIG. 5 is a circuit diagram of a structure of a plurality of pixels included in each of the pixel areas 101 to 104 of the stereoscopic image display device of FIG. 3 according to an some embodiments.

With reference to FIG. 5, a pixel according to some embodiments may be formed of a driving transistor Md, a switching transistor m1, a light emission control transistor M2, a storage capacitor Cst, and an OLED. FIG. 5 illustrates a driving circuit of a pixel, having a 3T1C structure which includes three transistors and one capacitor, but the structure of the driving circuit is not limited thereto.

FIG. 5 illustrates a pixel located at the m-th pixel column among a plurality of pixels included in the n-th pixel line among a plurality of pixel lines.

Thus, the pixel in FIG. 5 is connected to the corresponding n-th scan line among the plurality of scan lines, the n-th light emission control line among the plurality of light emission control lines, and the m-th data line among the plurality of data lines.

In further detail, the driving transistor Md of the pixel includes a gate electrode connected to a first node N1, a source electrode connected to a second node N2 connected with a power supply line supplying the first power source voltage ELVDD, and a drain electrode connected to the light emission control transistor M2.

The driving transistor Md may be turned on by receiving a voltage higher than a gate-on voltage level with the gate electrode, and controls the OLED to emit light by flowing a driving current corresponding to the voltage applied to the gate electrode to an anode of the OLED. The gate electrode of the driving transistor Md is connected to the first node N1 and a data voltage according to an image data signal applied to the first node N1 is maintained by the storage capacitor Cst so that the driving transistor Md is turned on to display an image by forming a driving current path according to the data voltage.

In addition, the switching transistor M1 of the pixel includes a gate electrode connected with the n-th scan line to which the pixel is connected, a source electrode connected with the m-th data line to which the pixel is connected, and a drain electrode connected to the first node N1.

The switching transistor M1 is turned on responding to the n-th scan signal S[n] transmitted to the gate electrode, and switches a data voltage corresponding to a data signal D[m] transmitted through the m-th data line to the first node N1. That is, according to some embodiments, when activated by a scan signal, each pixel included in the display unit transmits a voltage according to an image data signal of the corresponding view point of the corresponding frame to the first node N1, that is, a node connected with the gate electrode of the driving transistor Md.

The first node N1 is connected with a first electrode of the storage capacitor Cst. The second node N2, to which the source electrode of the driving transistor Md is connected, is connected with a second electrode of the storage capacitor Cst. The second node N2 is connected with the power supply line supplying the first power source voltage ELVDD. Thus, when a data voltage according to the data signal is applied to the first node N1, the storage capacitor Cst maintains the voltage of the first node N1 for a predetermined period. That is, the storage capacitor Cst writes data by storing a voltage corresponding to a voltage difference (i.e., a gate-source voltage difference of the driving transistor) between the voltage of the first node and the first power source voltage ELVDD transmitted to the second node N2 for a predetermined period. As described above, when the driving transistor Md is turned on, the OLED emits light with a driving current corresponding to the data voltage written in the first node N1 by the storage capacitor Cst.

The pixel of FIG. 5 includes a light emission control transistor M2 between the drain electrode of the driving transistor Md and the anode of the OLED to control a time point and a period of displaying an image by the light emission of the OLED.

In further detail, the light emission control transistor M2 includes a gate electrode connected to the n-th light emission control line, a source electrode connected to the drain electrode of the driving transistor Md, and a drain electrode connected to the anode of the OLED.

For a period during which the light emission control transistor M2 is turned on responding to the n-th light emission control signal EM[n] transmitted through the n-th light emission control line, a driving current path is formed between the driving transistor Md and the OLED so that a driving current flows therethrough and the OLED displays an image according to the data signal.

That is, a period during which the light emission control signal EM[n] is transmitted as a gate-on voltage level (i.e., a low voltage level in the case that the transistor is a PMOS type transistor like the pixel shown in FIG. 5) is a light emission period during which a pixel emits light according to the data signal.

On the contrary, a period during which the light emission control signal EM[n] is transmitted as a gate-off voltage level (high voltage level in FIG. 5) is a date writing period during which light emission of the pixel is blocked and the data voltage according to the data signal is charged in the storage capacitor Cst corresponding to a non-light emission period.

The OLED includes an anode connected to the drain electrode of the light emission control transistor M2 and a cathode connected to the power supply line supplying the second power source voltage ELVSS.

According to some embodiments, since a left-eye image and a right-eye image should be alternately displayed during one frame, the light emission control signal EM[n] transmitted to the light emission control transistor M2 is adjusted to control light emission accordingly. That is, the light emission control signal EM[n] is adjusted to include two light emission periods (i.e., image displaying periods) are included in one frame and two non-light emission periods (i.e., image data writing periods) before the light emission period.

For example, since the pixel is a PMOS type pixel in the pixel structure of FIG. 5, a pulse voltage of the light emission control signal EM[n] transmitted during one frame period is in high level during the non-light emission period for writing the left-eye image data signal or the right-eye image data signal and stored as a low level voltage during the left-eye image light emission period or the right-eye image light emission period, and then transmitted to the respective pixels of the display unit.

Furthermore, according to the some embodiments as illustrated in FIG. 3, the plurality of light emission control signals transmitted to each pixel area of the display unit 10 may respectively have the same data writing period (i.e., non-light emission period) and light emission period for each pixel included in each pixel area. That is, the plurality of light emission control signals transmitted to the pixels included in one pixel area have the same duty ratio at the same time point so that they have the same gate-on voltage level period and the gate-off voltage level period.

Hereinafter, a driving method of a stereoscopic image display device according to some embodiments will be described in further detail with reference to a frame configuration of FIG. 6.

Figure 6:
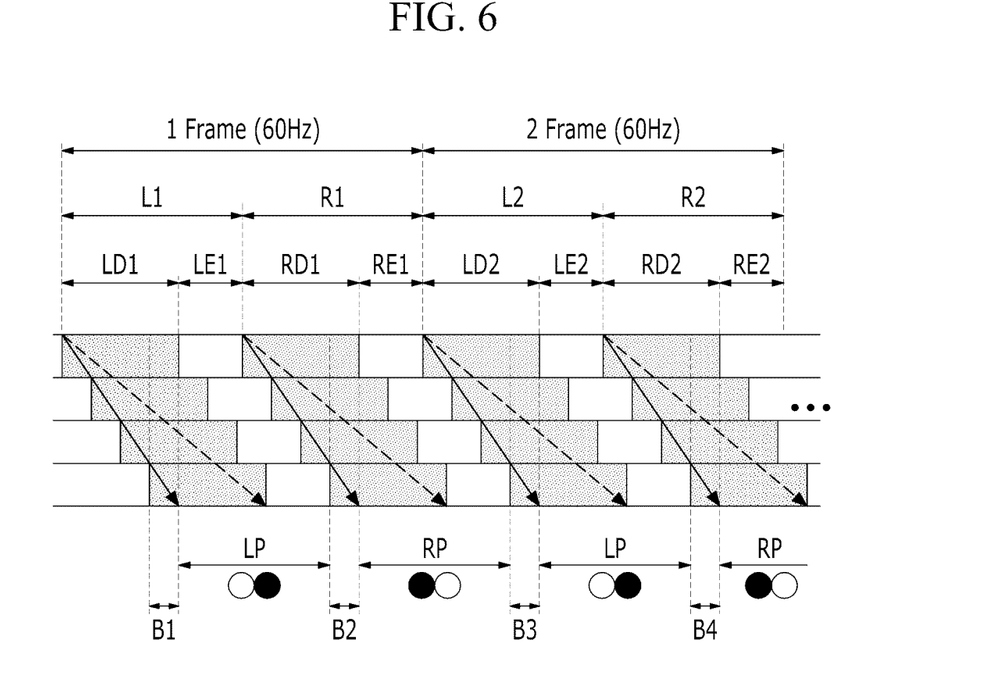
FIG. 6 is a frame schematic diagram of a driving method of a stereoscopic image display device according to some embodiments.

One frame of the stereoscopic image display device according to some embodiments as illustrated in FIG. 6 is formed of four sub-frames, and the frame frequency is 60 Hz.

That is, in FIG. 6, each unit frame is formed of left-eye image data signal writing periods LD1 and LD2, left-eye image display periods LE1 and LE2, right-eye image data signal writing periods RD1 and RD2, and right-eye image display periods RE1 and RE2.

The left-eye image periods L1 and L2 include left-eye image data signal writing periods LD1 and LD2 and left-eye image display periods LE1 and LE2. The right-eye image periods R1 and R2 include right-eye image data signal writing periods RD1 and RD2 and right-eye image display periods RE1 and RE2. Thus, the driving frequency of each of the left-eye image periods L1 and L2 and the right-eye image periods R1 and R2 is 120 Hz.

In FIG. 6, an image data signal writing period of each time point may be longer than an image display period during which light emission occurs according to the corresponding image data signal.

In FIG. 6, the image data signal writing period of each time point, that is, the left-eye image data signal writing periods LD1 and LD2 or the right-eye image data signal writing periods RD1 and RD2 correspond to a non-light emission period during which light emission of pixels included in the display unit 10 is blocked.

According to some embodiments, the image data signal writing period is set to prevent overlapping of the left-eye image display period LE1 and LE2 and the right-eye image display periods RE1 and RE2 that neighbor one another. That is, during a writing period for an image data signal, light emission is blocked by the light emission control signal so that each pixel does not emit light, and accordingly an image data signal writing period set between the two image display periods to prevent the neighboring left-eye image display periods and right-eye image display periods from interfering with each other, to thereby completely separate left and right display images. Accordingly, the crosstalk of the left and right images can be prevented.

In further detail, as illustrated in FIG. 6, the left-eye image display period and the right-eye image display period are alternately set, interposing periods B1 to B4 respectively, and therefore the left and right image crosstalk does not occur. The periods B1 to B4 are non-light emission periods throughout the entire area of the display unit 10 along the image data signal writing period, and may be defined as a black period. The length of each of the black periods B1 to B4 is not restrictive, and may be set to a length that can separate the left and right images.

As illustrated in FIG. 6, the image data signal writing period and the image display period are set with a ratio of 3:1. For example, since the left-eye image periods L1 and L2 or the right-eye image periods R1 and R2 may be driven at approximately 120 Hz, the left-eye image data signal writing periods LD1 and LD2 or the right-eye image data signal writing periods RD1 and RD2 may be driven at approximately 160 Hz, and the left-eye image display periods LE1 and LE2 and the right-eye image display periods RE1 and RE2 may be driven at approximately 480 Hz. The image data signal writing period is set to a frequency that is as low as ⅓ of the image display period so that charging time for an accurate data voltage can be sufficiently provided in the stereoscopic image display device having a relatively large-sized display unit.

The length of each of the black periods B1 to B4, separating the left and right images, is charged according to the number of pixel areas partitioned for each pixel line of the display unit 10.

A ratio of the image data signal writing period and the corresponding image display period is fixed to be equal, the length of each of the black periods B1 to B4 is increased as the number of pixel areas of the display unit 10 of the stereoscopic image display device is decreased. Alternatively, the length of each of the black periods B1 to B4 is decreased as of the number of pixel areas is increased.

Further, a range of the entire scanning speed of the display unit 10 may be changed according to the number of pixel areas, in addition to adjustment of the length of the black period. According to some embodiments, the display unit 10 includes four pixel areas. If the display unit 10 includes 1080 pixel lines, each pixel area includes 270 pixel lines. In the driving method of the stereoscopic image display device according to some embodiments as illustrated in FIG. 6, the scan signal is sequentially transmitted to the approximately 270 pixel lines of each pixel area, and thus the scan signal is sequentially transmitted to the approximately 1080 pixel lines of the four pixel areas. Then, the pixels are activated corresponding to the sequentially transmitted scan signal and the corresponding data signal is written to the pixels. However, a light emission period after data is written to the plurality of pixels included in the four pixel areas is performed for each pixel area. The plurality of pixels included in the first pixel area 401 (i.e., the uppermost pixel area of the display unit) is maintained with a voltage according to the data signal for a predetermined time period and then simultaneously emit light. A period during which light emission occurs for each pixel area and an image is displayed is called a sub image display period. A light emission period of the first pixel area 401 is defined as a first sub image display period. Subsequently, a plurality of pixels included in the second pixel area 402 simultaneously emit light after data is written thereto and a predetermined time is passed, and the second sub image display period is started subsequent to a start time of the first sub image display period.

Through such a process, a plurality of pixels simultaneously emit light for each pixel area until reaching a fourth sub image display period of the last pixel area 404. However, light emission is sequentially performed. An image display period is formed including the first sub-image display period to the fourth sub-image display period. In this case, an image includes a left-eye image and a right-eye image and the left and right-eye images are displayed through the same process. As a result, a repeated description will be omitted.

A driving frequency of a scan signal that sequentially scans a total pixel lines of the display unit 10 may be determined within a frequency range of the image data signal writing period.

In further detail, with reference to FIG. 6, the four pixel areas are sequentially scanned with a scanning speed selected from the driving frequency range marked as dotted lines and solid lines. Since the solid line denotes higher frequency than the dotted line, the scanning speed is selected to be sufficiently low during the data signal writing period to write accurate data for a sufficient time period according to the present exemplary embodiment. In FIG. 6, the image data signal writing period may be set to approximately 160 Hz, and therefore the scanning speed may be determined within the frequency range. That is, when the scanning is performed with solid line scanning speed at high speed, the scanning time becomes about 6.25 ms, and when the scanning is performed with the dotted line scanning speed at low speed, the scanning time becomes about 8.4 ms. According to the image data writing period of the exemplary embodiment of FIG. 6, the scanning time may be selected within the minimum of about 6.25 ms to the maximum of about 8.4 ms. The scanning speed in a driving process of a conventional stereoscopic image display device where black data is inserted is as high as approximately 240 Hz, and the scanning time at this point is about 4.2 ms. Thus, the stereoscopic image display device according to the exemplary embodiment of the present invention can assure the scanning time further longer than the conventional art so that data writing can be sufficiently and accurately performed.

According to some embodiments, the selection range of the scanning speed, that is, a range between the dotted line speed at low speed and the solid line speed at high speed is changed according to the number of pixel areas. When a ratio between the image data signal writing period and the corresponding image display period is fixed to be the same, a selection range of the scanning speed of the display unit 10 having much more pixel areas is lower than a selection range of the scanning speed of the display unit 10 having relatively less pixel areas.

For example, as shown in FIG. 6, when the ratio of the image data signal writing period to the corresponding image display period is fixed to approximately 3:1, a selection range of the scanning speed of the display unit partitioned to 8 pixel areas is lower than the selection of the scanning speed of the display partitioned to four pixel areas of FIG. 6. On the contrary, when the display unit is partitioned to 2 pixel areas that is half of the number of pixel areas of FIG. 6, the selection range of the scanning speed of the display unit having two pixel areas is faster than the selection range of the scanning speed of the display unit partitioned to four pixel areas of FIG. 6.

With reference to FIG. 6, after the entire pixel areas of the display unit 10 are sequentially scanned according to the frequency selected within the frequency range between the solid line and the dotted line, a voltage according to the data signal is charged during the corresponding view point image data signal writing period. The image according to the data voltage is displayed by sequentially performing simultaneous light emission for each pixel area.

In FIG. 6, the corresponding view point lens of the shutter lenses is opened corresponding to a start time of the image display period including four sub image display periods.

That is, the left eye lens and the right eye lens of the shutter lenses are alternately opened and closed corresponding to the stereoscopic image display device, and the left-eye image display periods LE1 and LE2 formed of four sub left-eye image display periods are a period LP during which the left eye lens of the shutter lenses is opened. In addition, the right-eye image display periods RE1 and RE2 formed of four sub right-eye image display periods is a period RP during which the right eye lens of the shutter lenses is opened. In this case, the left eye lens and the right eye lens of the shutter lenses are opened and closed during each of the black periods B1 to B4.

Thus, according to the exemplary embodiment of the present invention, the crosstalk of the stereoscopic image display device can be prevented by adjusting the black periods B1 to B4 that are transition periods during which the left and right lenses of the shutter lenses, and simultaneously the scanning speed of the display unit can be set to sufficient low speed by determining the number of pixel areas of the display unit.

As described above, disclosed embodiments describe a driving method of a stereoscopic image display device that can realize clear three-dimensional image quality by completely eliminating crosstalk of a left-eye image and a right-eye image by improving the driving method of a stereoscopic image display device according to conventional methods. The driving method disclosed enables accurate data charging in a large-sized display panel by sufficiently providing a data writing period and a non-light emission period, and compensating luminance reduction to a maximum degree.

The technical problems achieved by the present invention are not limited to the foregoing technical problems. Other technical problems, which are not described, can clearly be understood by those skilled in the art from the above description of the present invention.

A stereoscopic image display device according to some embodiments includes: a scan driver configured to transmit a plurality of scan signals to a plurality of scan lines, a data driver configured to transmit a plurality of data signals to a plurality of data lines, a light emission driver configured to transmit a plurality of light emission control signals to a plurality of light emission control lines, and a display unit divided into a plurality of pixel areas including a plurality of pixel lines. Each of the plurality of pixel areas are formed of pixels connected to the corresponding scan line, data line, and light emission control line. The display device includes a controller configured to control the scan driver, the data driver, and the light emission driver, generate a left-eye image data signal and a right-eye image data signal, and supply the generated signals to the data driver. The light emission driver may include a plurality of light emitting circuits respectively corresponding to the plurality of pixel areas. Each of the plurality of light emitting circuits may sequentially transmit a plurality of light emission control signals that are equivalent to each other to a plurality of light emission control lines of the corresponding pixel area.

According to some embodiments, the light emission driver may include a first light emitting circuit which is synchronized at the scan start time and transmitted to a plurality of light emission control signals that block light emission of the corresponding pixel area. For example, a first period during which other plurality of light emitting circuits respectively transmit a plurality of light emission control signals to block light emission of the corresponding pixel area before the first light emitting circuit transmits the plurality of light emission control signals for light emission of the corresponding pixel area may exist.

A plurality of light emission control signals which are transmitted to the corresponding pixel area of the plurality of pixel areas have the same on-duty ratio at the same time point. Thus, in an exemplary embodiment including four pixel areas, four groups of a plurality of light emission control signals transmitted to each of the four pixel areas are provided with the same signal in each group.

According to some embodiments, each of the plurality of light emitting circuits sequentially shifts a plurality of light emission control signals transmitted to the corresponding pixel area of the plurality of pixel areas by a second period from an upper pixel area and a lower pixel area and then transmits the shifted signals to the corresponding pixel area. For example, four groups of a plurality of light emission control signals transmitted to a first pixel area to a fourth pixel area among the plurality of pixel areas are transmitted in a gate-on voltage level through the corresponding four light emitting circuits, and the timing is sequentially shifted by the second period.

Thus, responding to the plurality of light emission control signals transmitted in the gate-on voltage level for each pixel area, a left-eye image period or a right-eye image period of each pixel are gradually shifted by the second period.

According to some embodiments, all of the pixels included in the plurality of pixel areas are sequentially activated for each of the plurality of pixel lines included in the plurality of pixel areas.

Thus, each of the sequentially activated pixels emits light corresponding to a view point image at the same time for each pixel area while charging a data voltage according to a data signal of the corresponding view point for a different period for each pixel line.

According to some embodiments, one frame includes a left-eye image display period according to the left-eye image data signal and a right-eye image display period according to the right-eye image data signal. The left-eye image display period is formed of a left-eye image period of each of the pixel areas that sequentially emit light, and the right-eye image display period is formed of a right-eye image period of each of the pixel areas that sequentially emit light.

The first period may be correspond to a non-light emission period during which light emission of the entire pixels included in a plurality of pixel areas are simultaneously blocked.

Although it is not particularly limited, the non-light emission period may be disposed between the final terminal period of a left eye (or, right eye) image period for each pixel area and the initial start time of a right eye (or, left eye) image period for each pixel area.

The non-light emission period is included in a period during which a data voltage corresponding to the left-eye image data signal or the right-eye image data signal is changed and maintained in a pixel included in the plurality of pixel areas.

The non-light emission period may be shortened as the number of the plurality of pixel areas is increased. Alternatively, the non-light emission period may be increased as the number of pixel areas is decreased.

During the non-light emission period, left eye lens and right eye lens of shutter lenses are opened and closed. Thus, the non-light emission period is a function of a transition time during which the left eye lens and the right eye lens of the shutter lenses are opened and closed. That is, the length of the non-light emission period is shortened as the transition time of the shutter lenses is decreased. When the non-light emission length is shortened, the number of pixel areas of the display unit may be increased.

In the present invention, the scan driver transmits a plurality of scan signals that sequentially activate pixels for each pixel line to a plurality of scan lines of each of the pixel areas.

The scanning speed of the plurality of scan signals may be determined within a selection range of a scanning speed that the plurality of scan signals are transmitted to the entire plurality of pixel areas from a scan start time to a light emission start time of the first pixel area of the plurality of pixel areas and a scanning speed that the plurality of scan signals are transmitted to the entire plurality of pixel areas from the scan start time to a light emission start time of the last pixel area of the plurality of pixel areas.

The selection range is changed according to the number of the plurality of pixel areas. That is, the selection range of the scanning speed moves to the low frequency area as the number of pixel areas is increased, and the selection range of the scanning speed moves to the high frequency area.

In the present invention, a period during which the left-eye image data signal or the right-eye image data signal is written to the entire pixel areas is longer than a left-eye image display period according to the left-eye image data signal or a right-eye image display period according to the right-eye image data signal.

In the present invention, the driving frequency of the plurality of scan signals transmitted to the entire pixel areas is lower than the entire driving frequencies of the plurality of light emission control signals transmitted to each of the plurality of pixel areas.

In addition, a period during which the plurality of light emission control signals transmitted to the corresponding pixel area among the plurality of pixel areas block light emission of the corresponding pixel area is longer than a period during which the corresponding pixel area emits light.

A driving method of a stereoscopic image display device according to another exemplary embodiment of the present invention relates to a driving method of a stereoscopic image display device including a plurality of pixel areas formed of a plurality of pixel lines, one frame including a sub-frame of a left-eye image data signal writing period, a left eye display period according to the left-eye image data signal, a right-eye image data signal writing period, and a right-eye image display period according to the right-eye image data signal. In further detail, the driving method includes: sequentially activating pixels of each pixel line with a scan signal transmitted corresponding to each of the plurality of pixel lines; charging a data voltage corresponding to the left-eye image data signal or the right-eye image data signal by the pixel; and simultaneously displaying a left-eye image or a right-eye image according to the data voltage with a plurality of equivalent light emission control signals that control light emission of the corresponding pixel area to the respective pixel areas.

In the driving method according to some embodiments, a period during which a plurality of light emission control signals for blocking of light emission of other plurality of pixel areas may exist between a time at which a plurality of light emission control signals for blocking light emission of a first pixel area among the plurality of pixel areas are transmitted and a time at which a plurality of light emission control signals for light emission of the first pixel area are transmitted. The time at which the plurality of light emission control signals for blocking light emission of the first pixel area may start by being synchronized at the time that the scan signals are transmitted.

A sub-frame of the left-eye image display period or the right-eye image display period is formed of a left-eye image period or a right-eye image period that is simultaneously displayed for each pixel area. That is, the left-eye image display period may be formed of left-eye image periods of the respective pixel areas that sequentially emit light, and the right-eye image display period may be formed of right-eye image periods of the respective pixel areas that sequentially emit light.

In this case, the left-eye image period of each of the plurality of pixel areas and the right-eye image period of each of the plurality of pixel areas may be simultaneously displayed while being sequentially shifted by a predetermined time period from the upper pixel area to the lower pixel area of the plurality of pixel areas.

The period may correspond to a non-light emission period during which light emission of the entire pixels included in a plurality of pixel areas are simultaneously blocked.

The activation of the pixels and the charging of the data voltage are longer than the displaying the left-eye image or the right-eye image according to the data voltage.

The entire driving frequencies of the scan signals transmitted to each of the plurality of pixel lines are lower than the entire driving frequencies of the plurality of light emission control signals transmitted to each pixel area.

According to some embodiments, the crosstalk of the left-eye image and the right-eye image in the display device displaying a stereoscopic image is completely prevented to thereby realize a clear three-dimensional stereoscopic image.

Further, according to some embodiments, luminance loss occurring during a crosstalk solving process is compensated, and a data writing period and a non-light emission period are sufficiently assured such that a clear three-dimensional stereoscopic image can be provided with high quality in a large-sized image display device.

While this invention has been described in connection with what is presently considered to be practical exemplary embodiments, it is to be understood that the invention is not limited to the disclosed embodiments. But, on the contrary, this invention is intended to cover various modifications and equivalent arrangements included within the spirit and scope of the appended claims. Further, the materials of the components described in the specification may be selectively substituted by various known materials by those skilled in the art. In addition, some of the components described in the specification may be omitted without reduction in the performance or added in order to improve the performance by those skilled in the art. Moreover, the sequence of the steps of the method described in the specification may be changed depending on a process environment or equipments by those skilled in the art. Accordingly, the scope of the present invention should be determined by the scope of the appended claims and the equivalents thereto.

What is claimed is:

1. A stereoscopic image display device comprising:
   a scan driver configured to transmit a plurality of scan signals to a plurality of scan lines;
   a data driver configured to transmit a plurality of data signals to a plurality of data lines;
   a light emission driver configured to transmit a plurality of light emission control signals to a plurality of light emission control lines, the light emission driver comprising a first light emitting circuit configured to transmit a plurality of light emission control signals that block light emission of a corresponding pixel area by being synchronized at a scan start time, and configured to control a first period during which a plurality of light emitting circuits respectively transmit the plurality of light emission control signals to block light emission of the corresponding pixel area before the first light emitting circuit transmits the plurality of light emission control signals for light emission of the corresponding pixel area exists;
a display unit divided into a plurality of pixel areas including a plurality of pixel lines, each of the plurality of pixel areas configured to form a plurality of pixels respectively connected to the corresponding scan line, data line, and light emission control line; and
a controller configured to control the scan driver, the data driver, and the light emission driver, generate a left-eye image data signal and a right-eye image data signal, and supply the generated signals to the data driver,
wherein the light emission driver comprises a plurality of light emitting circuits respectively corresponding to the plurality of pixel areas, and wherein each of the plurality of light emitting circuits sequentially transmits a plurality of light emission control signals that are equivalent to each other to a plurality of light emission control lines of the corresponding pixel area.

2. The stereoscopic image display device of claim 1, wherein the first period corresponds to a non-light emission period during which light emission of pixels included in the plurality of pixel areas are simultaneously blocked.

3. The stereoscopic image display device of claim 1, wherein the first period is included in a period during which a data voltage corresponding to the left-eye image data signal or a data voltage corresponding to the right-eye image data signal is charged in a pixel included in the plurality of pixel areas and then maintained.

4. The stereoscopic image display device of claim 1, wherein the first period is shortened as the number of the plurality of pixel areas is increased.

5. The stereoscopic image display device of claim 1, wherein during the first period, left eye lens and right eye lens of shutter lenses are opened and closed.

6. The stereoscopic image display device of claim 1, wherein during the first period is a function of a transition time of opening and closing of left eye lens and right eye lens of shutter lenses.

7. The stereoscopic image display device of claim 1, wherein the display unit displays a left-eye image according to the left-eye image data signal and a right-eye image according to the right-eye image data signal for one frame, and wherein
the left-eye image display period is formed of a left-eye image period wherein each of the plurality of pixel areas that sequentially emit light, and
the right-eye image display period is formed of a right-eye image period wherein each of the plurality of pixel areas that sequentially emit light.

8. The stereoscopic image display device of claim 1, wherein a plurality of light emission control signals transmitted to the corresponding pixel area have the same duty ratio at the same time.

9. The stereoscopic image display device of claim 1, wherein each of the plurality of light emitting circuits sequentially shifts a plurality of light emission control signals transmitted to the corresponding pixel area of the plurality of pixel areas by a second period and then transmits the shifted signals to the corresponding pixel area from an upper pixel area to a lower pixel area.

10. The stereoscopic image display device of claim 9, wherein the plurality of pixel areas sequentially shift a left-eye image according to a left-eye image data signal or a right-eye image according to a right-eye image data signal for each pixel area by the second period and display the shifted images.

11. The stereoscopic image display device of claim 1, wherein the scan driver transmits a plurality of scan signals that sequentially activate pixels for each pixel line to a plurality of scan lines of each of the plurality of pixel areas.

12. The stereoscopic image display device of claim 11, wherein a scanning speed of the plurality of scan signals is determined within a selection range of a scanning speed that the plurality of scan signals are transmitted to all of the plurality of pixel areas from a scan start time to a light emission start time of the first pixel area of the plurality of pixel areas and a scanning speed that the plurality of scan signals are transmitted to all of the plurality of pixel areas from the scan start time to a light emission start time of the last pixel area of the plurality of pixel areas.

13. The stereoscopic image display device of claim 12, wherein the selection range is changed according to the number of the plurality of pixel areas.

14. The stereoscopic image display device of claim 11, wherein a driving frequency of the plurality of scan signals transmitted to all of the plurality of pixel areas is lower than all of the driving frequencies of a plurality of light emission control signals transmitted to each of the plurality of pixel areas.

15. The stereoscopic image display device of claim 1, wherein a period during which the plurality of light emission control signals transmitted to the corresponding pixel area of the plurality of pixel areas block light emission of the corresponding pixel area is longer than a period during which the corresponding pixel area emits light.

16. A driving method of a stereoscopic image display device including a plurality of pixel areas formed of a plurality of pixel lines, one frame including a sub-frame of a left-eye image data signal writing period, a left eye display period according to the left-eye image data signal, a right-eye image data signal writing period, and a right-eye image display period according to the right-eye image data signal, comprising:
sequentially activating pixels of each pixel line with a scan signal transmitted corresponding to each of the plurality of pixel lines;
charging a data voltage corresponding to the left-eye image data signal or the right-eye image data signal to be displayed by the pixel; and
simultaneously displaying a left-eye image or a right-eye image according to the data voltage with a plurality of equivalent light emission control signals that control light emission of the corresponding pixel area to the respective pixel areas;
wherein a period during which a plurality of light emission control signals for blocking light emission of a set of the plurality of pixel areas exists between a time at which a plurality of light emission control signals for blocking light emission of a first pixel area among the plurality of pixel areas are transmitted and a time at which a plurality of light emission control signals for light emission of the first pixel area are transmitted.

17. The driving method of claim 16, wherein the period is a non-light emission period during which light emission of all of the pixels included in a plurality of pixel areas are simultaneously blocked.

18. The driving method of claim 16, wherein the period is included in a period during which a data voltage corresponding to a left-eye image data signal or a right-eye image data signal is charged and maintained in the pixels included in the plurality of pixel areas.

19. The driving method of claim 16, wherein the period is shortened as the number of the plurality of pixel areas is increased.

20. The driving method of claim 16, wherein during the period, a left eye lens and right eye lens of shutter lenses are opened and closed.

21. The driving method of claim 16, wherein the period is a function of a transition time that left eye lens and right eye lens of shutter lenses are opened and closed.

22. The driving method of claim 16, wherein
the left-eye image display period is formed of left-eye image periods of the respective pixel areas that sequentially emit light, and
the right-eye image display period is formed of right-eye image periods of the respective pixel areas that sequentially emit light.

23. The driving method of claim 16, wherein a plurality of light emission control signals transmitted to the corresponding pixel area of the plurality of pixel areas have the same duty ratio at the same time.

24. The driving method of claim 16, wherein the left-eye image or the right-eye image is sequentially shifted by a second period from an upper pixel area to a lower pixel area of the plurality of pixel areas and then simultaneously displayed.

25. The driving method of claim 16, wherein a scanning speed of the scan signal is determined within a selection range of a scanning speed for transmitting the plurality of scan signals to all of the pixel areas from a scanning start time to a light emission start time of the first pixel area among the plurality of pixel areas and a scanning speed for transmitting the plurality of scan signals to the entire pixel areas from the scanning start time to a light emission start time of the last pixel area among the plurality of pixel areas.

26. The driving method of claim 25, wherein the selection range is charged according to the number of the pixel areas.

27. The driving method of claim 16, wherein activation of the pixel and charging of the data voltage correspond to a longer duration than displaying a left-eye image or a right-eye image according to the data voltage.

28. The driving method of claim 16, wherein the all of the driving frequencies of the scan signals transmitted to each of the pixel lines are lower than the all of the driving frequencies of a plurality of light emission control signals transmitted to each of the pixel areas.

* * * * *